Sept. 4, 1928.

C. E. MAYNARD 1,682,923

METHOD OF PRODUCING RUBBER TUBES

Filed April 16, 1926

INVENTOR.
BY Charles Edgar Maynard

ATTORNEY.

Patented Sept. 4, 1928.

1,682,923

UNITED STATES PATENT OFFICE.

CHARLES EDGAR MAYNARD, OF NORTHAMPTON, MASSACHUSETTS, ASSIGNOR TO THE FISK RUBBER COMPANY, OF CHICOPEE FALLS, MASSACHUSETTS, A CORPORATION OF MASSACHUSETTS.

METHOD OF PRODUCING RUBBER TUBES.

Application filed April 16, 1926. Serial No. 102,458.

This invention relates to the manufacture of rubber tubes, particularly such as are intended for use as inner tubes for automobile tires. The main object of this invention is the production of rubber tubes upon mandrels without the necessity for using external wrapping, clamps, or so-called cuffs, upon the outer surface of the tube. In prior practice tubes which are vulcanized upon mandrels have either been wrapped down against the mandrel by a spiral wrapping of fabric tape throughout their length, or the ends of the tubes have been bound to the mandrel by some such device as metallic clamping members or by a taping of the ends only of the tube. The use of such expedients is avoided by my present invention. It is a further object of my invention to provide an effective way of preventing entrance between the tube and the mandrel of the fluid which is used for supplying vulcanizing heat to the tube. It is a further object of the invention to accomplish the above results without the necessity of increasing the number of manual operations necessary to perform in preparing the tube for vulcanization. It is a further object of the invention to accomplish these results without injuring the appearance of the tube.

Referring to the drawings.

In practicing my invention I apply either to the mandrel or to the rubber sheet which is to be rolled thereon a layer of adhesive rubber, conveniently in the form of rubber cement, allow the cement to dry, and locate the tube upon the mandrel with this adhesive area between the outer surface of the mandrel and the inner surface of the tube at a point substantially adjacent the end of the tube. Preferably this cement is of a low rubber and low solvent composition so as to avoid difficulty due to the liberation of gas during the cure. Preferably, also, the cement is applied to the mandrel rather than to the rubber stock as it is much easier to apply and to insure drying. Preferably, also, the cement is applied in a series of bands as I have found that more ready and accurate application of cement can be had if it is applied in this form. After the adhesive rubber has been introduced by this or other methods between the tube and the mandrel, the mandrel with the tube upon it is placed in a heater surrounded by a heating fluid, such as steam or water, and subjected to the heat from this fluid for a length of time sufficient to vulcanize the rubber. This fluid, as is customary, is kept under pressure and the pressure serves to force the cement into a very thin layer which tightly seals the end of the tube against entrance of the heating fluid between it and the mandrel.

Figure 1:
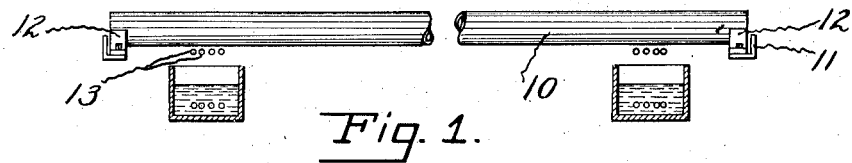
Fig. 1 is a diagrammatic front elevation of a mandrel illustrating the way in which it is treated prior to the rolling of the tube thereon.
Figure 2:
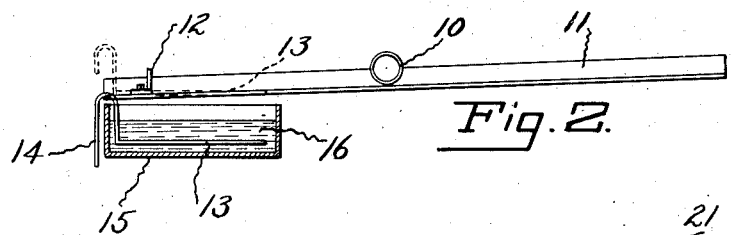
Fig. 2 is a diagrammatic side elevation of the same.
Figure 4:
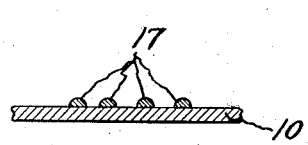
Fig. 4 is an enlarged detail section of a portion of the mandrel.
Figure 5:
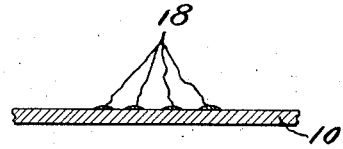
Fig. 5 is a similar view at a later stage.

An apparatus for applying the cement to the mandrels is disclosed in my application Serial No. 167,946, filed February 14, 1927, and is indicated only diagrammatically in the present case. In Figs. 1 and 2 the mandrel 10 is shown as supported by tracks 11 upon which are placed stops 12. As the mandrel rolls down the track it runs upon rods 13 which are coated with a liquid rubber cement. These rods are mounted upon a frame 14 and are normally lowered, as shown in full lines in Fig. 2, into a tank 15 containing liquid rubber cement 16. Preferably the rods are raised out of the tank a short time before the mandrel reaches them so that the cement has a chance to drain off and leave a fairly constant deposit upon the surface of the rod. As the mandrel passes over the rods, which are long enough to cover the complete circumference of the mandrel, the cement is transferred to the surface of the mandrel, forming ridges 17 shown in section in Fig. 4. The cement on the mandrel is then dried, resulting in some contraction of the cement as indicated at 18 in Fig. 5.

Figure 3:
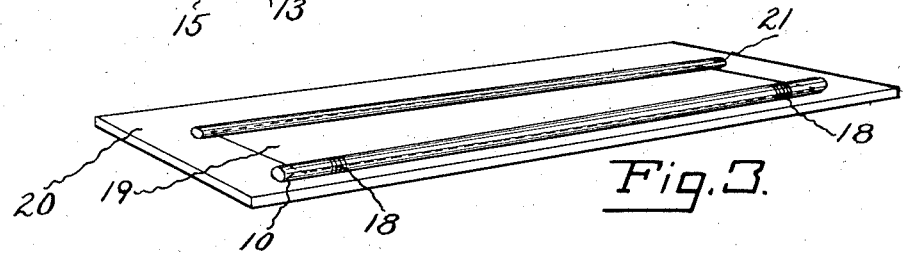
Fig. 3 is a diagrammatic perspective view showing the rubber sheet and the mandrel associated prior to the rolling of the tube upon the mandrel.

The mandrel is now ready for the rolling operation. A strip of rubber 19 is placed upon a suitable rolling table 20. The mandrel, with the dried cement strips 18, is now placed on one edge of the rubber strip as indicated in Fig. 3, and a tension bar 21 is placed upon the other edge of the strip. The rolling operation is now started, the rubber stock adhering to the mandrel and to the cement strips. After the stock has passed around the mandrel enough to give a grip, the mandrel is pulled away from the tension bar 21 so as to give a lateral stretch to the rubber stock. The rolling is then completed, the stock by this means being placed under a tension which causes it to contract upon the mandrel and to force itself down firmly upon the cement strips 18.

Figure 6:
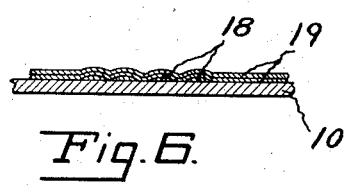
Fig. 6 is a similar view at a still later stage.

Preferably the mandrel is kept warm—as warm as convenient to handle—before the cementing operation, as the cement on a warm mandrel will dry without the necessity of any special drying step other than a slight allowance of time. In some cases it is desirable, in order to make a more perfect seal between the rubber and the mandrel, to have some of the cement strips wider than the others. If the size of the rods 13 is increased to increase the size of the cement strips, it will be found that the thickness of the cement deposit will be increased over that of the strips deposited by the narrow rods. This is obviously not desirable as a uniform thickness of cement upon the end of the tube will give more uniform results. To accomplish the desired object without increasing the thickness of the cement, two rods are placed fairly close together at a point where the wide cement strip is desired. In the drawings the two rods adjacent each end of the mandrel are shown as having this decreased spacing. As the cement settles upon the mandrel, after having been applied and during the drying operation, the separate strips deposited by these two end rods will merge together, as shown at the left in Fig. 5. This same condition is preserved when the rubber sheet is rolled upon the mandrel as shown in Fig. 6.

Figure 7:
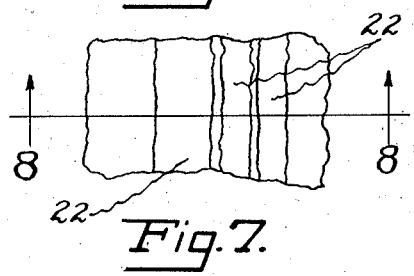
Fig. 7 is a detail view of a portion of the surface of the tube which was cured adjacent the mandrel.
Figure 8:
Fig. 8 is a section on line 8—8 of Fig. 7.

The tube on the mandrel is now ready for vulcanization, and for this purpose is placed in a suitable vulcanizer and subjected to an enveloping heated fluid such as steam or water under pressure. The pressure of the fluid compacts the tube against the mandrel and flattens out the cement strips still further. As the cure proceeds the cement strips will become completely merged in the wall of the tube so that, if the composition of the cement is chosen properly with relation to the composition of the tube, there will be little if any contrast in appearance upon the surface of the finished tube at the points where the cement strips were located. In Fig. 7 the appearance of the cement strips on the finished tube has been indicated at 22, but in practice it will be found that the location of these strips will not be as apparent as has been indicated by the drawing. A section through the wall of the inner tube is shown in Fig. 8, where it is apparent that the cure and the pressure of the enveloping fluid has caused the rubber to form a homogeneous mass merging into one piece the plies of the rubber sheet 19 and the cement bands 18.

As mentioned above, it is desirable to employ a cement having a low rubber content. The lower the rubber content of the cement, the less solvent is needed for its solution. If a large amount of solvent is present in the cement there will be trouble during the cure with the volatilization of the solvent, with resulting blisters and other defects at the point where the cement bands are located. A reduction in the amount of solvent is therefore very desirable. I have found by experiment that a suitable cement for this purpose may be made up as follows. A batch of compounded rubber is first formed of the following composition:

| | Parts by weight. |
|---|---|
| Off color rubber | 40 |
| Sulphur | 3¼ |
| Zinc | 20 |
| Barytes | 136½ |
| Carbon black | ¼ |
| | 200 |

Fifty pounds of this compound are then dissolved in 25 gallons naphtha to make the cement. This particular compound is given for purposes of example only and the invention is not limited to the use of this exact formula.

Instead of cementing the mandrel it is possible to apply the cement to the rubber stock, the object in either case being to interpose a layer of cement between the rubber stock and the mandrel. In general, however, the application of cement to the rubber will not be as desirable as applying it to the mandrel for the reason that the use of a heated mandrel greatly facilitates the drying operation if the cement is applied to it, and also the application of cement to the mandrel is somewhat easier than the application of cement to the flat stock.

Having thus described my invention, I claim:

1. A method of producing a rubber tube which comprises applying bands of cement to a warm mandrel, allowing the cement to dry, rolling a sheet of rubber around the mandrel with the ends of the sheet overlying the bands, and vulcanizing the tube upon the mandrel without external confining means other than the enveloping atmosphere.

2. A method of producing a rubber tube which comprises applying bands of cement to a mandrel, drying the cement, rolling a sheet of rubber around the mandrel with the ends of the sheet overlying the bands, and vulcanizing the tube upon the mandrel without external confining means other than the enveloping atmosphere.

3. A method of producing a rubber tube which comprises applying to a mandrel encircling bands of rubber cement spaced apart slightly less than the length of the tube to be made, drying the cement, rolling under tension around the mandrel a sheet of rubber with its ends overlying the bands of cement, and vulcanizing the tube on the mandrel in an enveloping atmosphere of heated fluid, the entire outer surface of the tube being exposed directly to the action of the fluid, whereby entrance of the fluid between the tube and the mandrel is prevented by the cement without the necessity of external confining means.

4. A method of producing a rubber tube on a mandrel which comprises applying groups of spaced bands of rubber cement adjacent each end of the mandrel, rolling a sheet of rubber around the mandrel so that the ends of the sheet overlie the groups of cement bands, and vulcanizing the tube on the mandrel in an enveloping heated fluid without external confining means.

5. A method of producing a rubber tube on a mandrel which comprises applying to each end of the mandrel a group of bands of cement, each group comprising two bands closely spaced and at least one other band spaced at a greater distance, rolling a sheet of rubber around the mandrel so that the ends of the sheet overlie the groups of cement bands, and vulcanizing the tube on the mandrel in an enveloping heated fluid without external confining means.

CHARLES EDGAR MAYNARD.